July 27, 1965   J. G. PEACE, JR., ET AL   3,197,547
VENTABLE CLOSURE FOR CAPACITOR
Filed Jan. 29, 1963
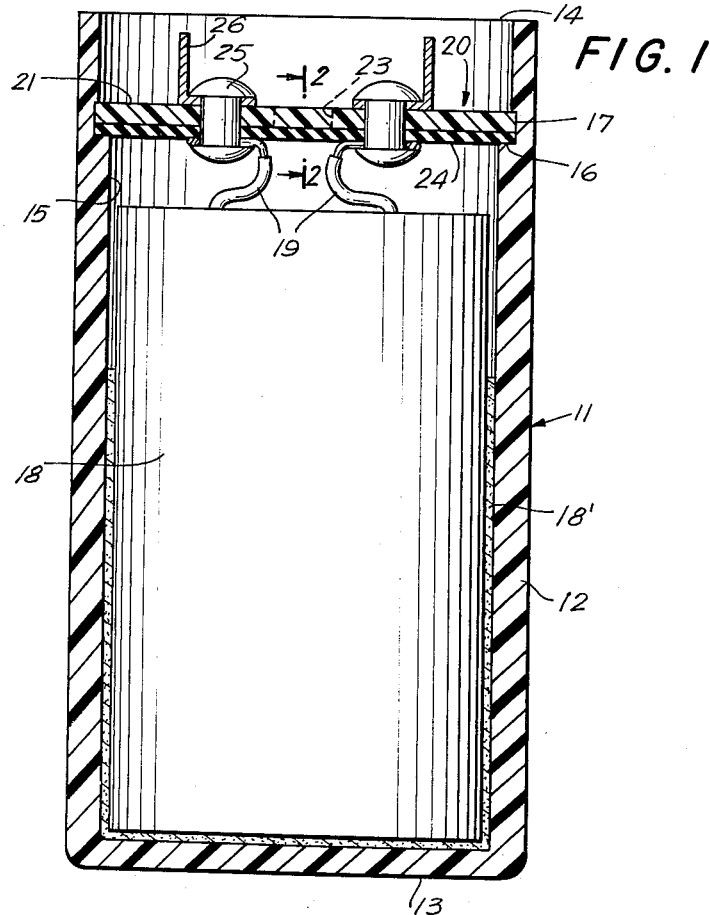
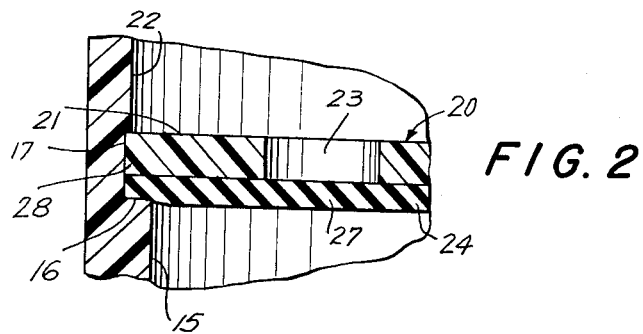
INVENTORS
JOHN G. PEACE, JR.
EDMOND F. ROGERS
BY
Dean, Fairbank & Hirsch
ATTORNEYS

United States Patent Office 3,197,547
Patented July 27, 1965

3,197,547
VENTABLE CLOSURE FOR CAPACITOR
John G. Peace, Jr., New Bedford, and Edmond F. Rogers, Fairhaven, Mass., assignors to Aerovox Corporation, New Bedford, Mass., a corporation of Massachusetts
Filed Jan. 29, 1963, Ser. No. 254,751
2 Claims. (Cl. 174—52)

This invention relates to the art of capacitors, more particularly of the motor start type.

As conducive to an understanding of the invention, it is noted that where a capacitor is packaged in a Bakelite container for example, and the cover of the container is provided with a peripheral metal retaining ring that will release the cover in the event that gas pressure builds up in the container above a predetermined amount, where the retaining ring is adjacent the terminals of the capacitor, which extend through the cover, arcing may occur with resultant danger of explosion and fire.

Where, to avoid the use of such metal retaining ring, the cover is permanently bonded to the container and a vent is provided in the cover which has a rubber closure that is designed to rupture to relieve excessive gas pressure, in the event of failure of such closure to rupture, the gas pressure build-up in the container may cause the latter to explode with the dangers above noted.

It is accordingly among the objects of the invention to provide a motor start capacitor which may readily be assembled and which will provide for dependable release of gas pressure without likelihood of explosion of the container and without need for any metal parts to retain the cover of the container in position, thereby avoiding the danger of arcing from the capacitor terminals.

According to the invention these objects are accomplished by the arrangement and combination of elements hereinafter described and more particularly recited in the claims.

In the accompanying drawings in which is shown one of various possible embodiments of the several features of the invention, FIG. 1 is a longitudinal sectional view of the capacitor according to the invention, and FIG. 2 is a fragmentary detail view on a larger scale of the cover retaining means, taken along line 2—2 of FIG. 1.

Referring now to the drawings, the capacitor comprises a rigid container or casing 11, preferably of suitable insulating material such as Bakelite, for example, which has a cylindrical body portion 12, a floor 13 integral therewith and a mouth 14.

The container 11 is of reduced diameter adjacent its mouth as at 15 defining an annular shoulder 16 and an annular groove 17 is provided adjacent said shoulder 16 which forms the floor of said groove.

Positioned in the container 11 is a capacitor section 18 of conventional type which has two terminal leads 19, extending from the upper end thereof, the capacitor preferably being retained in the container by suitable retaining material such as pitch 18'.

The mouth of the container 11 is closed by means of a cover 20, illustratively a circular disc 21 of diameter but slightly greater than the inner diameter of enlarged portion 22 of the container.

The disc 21 which is of insulating material such as fibre or Bakelite, has a vent opening 23 therethrough and a disc 24 of resilient compressible material such as gas impervious rubber is bonded to the undersurface of said disc 21, having a diameter substantially equal to that of rigid disc 21.

Extending through the composite discs 21 and 24 are studs 25 to the outer ends of which terminal tabs 26 are secured and the ends of terminal leads 19 are connected to the inner ends of said studs 25.

The mouth 14 of the capacitor is closed by forcing the cover member 20 downward until the periphery thereof snaps into the annular groove 17, the height of the groove 17 being such that the periphery of the rubber disc 24 will be compressed in such groove to define a gas-tight seal.

In operation of the capacitor if gas should develop in the container 11 and the pressure therein should exceed a predetermined amount, the portion 27 of the rubber disc 24 underlying the vent opening 23 will rupture to relieve the gas pressure.

In the event, for some reason, the portion 27 of the rubber disc 24 should not rupture, the pressure buildup in the container 11 will react against the cover 20. As a result of the relatively large surface area thereof subject to the internal gas pressure, the resultant force developed will push the cover outwardly moving the periphery 28 thereof out of the groove 17, thereby providing a vent for the gas and preventing explosion of the container.

With the construction above described, no additional elements are required to hold the cover 20 in place other than the container itself, yet there is assurance that in the event the resilient portion 27 underlying the vent 23 should not rupture, the periphery 28 of the cover 20 will be displaced from the retaining groove 17 to provide the desired venting action.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure Letters Patent of the United States is:

1. A capacitor unit comprising a hollow casing having a mouth, a capacitor section in said casing, a cover member comprising a disc of substantially rigid material, a disc of resilient compressible material of substantially the same diameter as said rigid disc bonded to the undersurface thereof, said cover member having terminals protruding therefrom and electrically connected to said capacitor section, said casing having an internal annular groove positioned between the upper end of the capacitor section and the mouth of the casing, said cover member being of diameter slightly less than the diameter of said annular groove and slightly greater than the inner diameter of said casing between the mouth thereof and said annular groove, the thickness of said cover member at the periphery thereof being normally slightly greater than the height of said groove, said cover member being positioned in said groove, whereby the periphery of said resilient disc will be compressed to effect a gas tight seal between said annular groove and the periphery of said cover.

2. The combination set forth in claim 1 in which said rigid disc has a vent opening and a portion of said disc of resilient compressible material underlies said opening, said portion being rupturable when the pressure in the casing exceeds a predetermined amount.

References Cited by the Examiner
UNITED STATES PATENTS

| | | | |
|---|---|---|---|
| 2,058,773 | 10/36 | Cole | 317—230 |
| 2,198,988 | 4/40 | Biniek | 220—44 |
| 2,779,813 | 1/57 | Collins | 317—242 |
| 2,881,368 | 4/59 | Hancock | 220—44 |

LARAMIE E. ASKIN, *Primary Examiner.*

JOHN F. BURNS, *Examiner.*